US012047740B2

(12) United States Patent
Zhang et al.

(10) Patent No.: US 12,047,740 B2
(45) Date of Patent: Jul. 23, 2024

(54) BALANCED ARMATURE RECEIVER

(71) Applicant: Knowles Electronics, LLC, Itasca, IL (US)

(72) Inventors: Yahui Zhang, Schaumburg, IL (US); Shehab Albahri, Hanover Park, IL (US)

(73) Assignee: Knowles Electronics, LLC, Itasca, IL (US)

( * ) Notice: Subject to any disclaimer, the term of this patent is extended or adjusted under 35 U.S.C. 154(b) by 183 days.

(21) Appl. No.: 17/842,744

(22) Filed: Jun. 16, 2022

(65) Prior Publication Data

US 2023/0412987 A1 Dec. 21, 2023

(51) Int. Cl.

*H04R 11/02* (2006.01)
*H01F 7/08* (2006.01)
*H01F 7/128* (2006.01)
*H04R 1/02* (2006.01)
*H04R 7/12* (2006.01)

(52) U.S. Cl.

CPC ............. *H04R 11/02* (2013.01); *H01F 7/081* (2013.01); *H01F 7/128* (2013.01); *H04R 1/025* (2013.01); *H04R 7/12* (2013.01); *H01F 2007/086* (2013.01)

(58) Field of Classification Search

CPC .......... H04R 11/02; H04R 1/025; H04R 7/12; H01F 7/081; H01F 7/128; H01F 2007/086
USPC .......................................................... 381/417
See application file for complete search history.

(56) References Cited

U.S. PATENT DOCUMENTS

| | | | | |
|---|---|---|---|---|
| 7,362,878 B2 * | 4/2008 | Miller | .................... | H04R 11/00 381/418 |
| 9,332,328 B2 | 5/2016 | Wu | | |
| 9,992,579 B2 | 6/2018 | Albahri et al. | | |
| 2018/0367916 A1 * | 12/2018 | Tjepkema | ............. | H04R 25/60 |

FOREIGN PATENT DOCUMENTS

| | | |
|---|---|---|
| CN | 203872027 U | 10/2014 |
| CN | 204118999 U | 1/2015 |
| CN | 204119001 U | 1/2015 |
| CN | 104754482 A | 7/2015 |
| CN | 104754483 A | 7/2015 |
| CN | 205596265 U | 9/2016 |
| CN | 107241001 A | 10/2017 |
| WO | 2015057519 A1 | 4/2015 |

* cited by examiner

*Primary Examiner* — Sean H Nguyen
(74) *Attorney, Agent, or Firm* — Loppnow & Chapa

(57) ABSTRACT

A balanced armature receiver including a motor with a yoke for retaining magnets and fastening to an armature are disclosed. The yoke includes a close-ended wall structure formed of a soft magnetic material having multiple folded corners defining an armature passage. A first magnet retaining wall portion of the yoke is arranged in parallel with, and opposite, a second magnet retaining wall portion, wherein at least a portion of the first magnet retaining wall portion has a reduced thickness relative to other wall portions of the close-ended wall structure. The armature is connected to the reduced thickness portion of the first magnet retaining wall portion, thereby reducing an overall z-axis dimension of the motor.

21 Claims, 5 Drawing Sheets

BALANCED ARMATURE RECEIVER

FIELD OF THE DISCLOSURE

The present disclosure relates generally to balanced armature receivers and more particularly to balanced armature receivers having reduced dimensions and improved performance, as well as motors and components for such receivers.

BACKGROUND

Balanced armature receivers, also referred to herein as "receivers", capable of producing an acoustic output signal in response to an electrical input signal generally comprise a diaphragm separating an interior of a case or housing into a back volume and a front volume coupled to a sound port. A motor disposed in the back volume comprises a coil disposed about an armature having a free end-portion balanced between permanent magnets retained by a yoke. The free end-portion of the armature is coupled to a movable portion of the diaphragm by a drive rod or other link, wherein a field induced by the electrical input signal moves the armature and diaphragm, which emits sound from the sound port. Such receivers are commonly used in hearing aids, wired and wireless earphones, True Wireless Stereo (TWS) devices, among other hearing devices.

Receivers are often integrated into receiver-in-canal (RIC) and completely-in-canal (CIC) hearing devices that fit partially or fully in the user's ear canal. Other wearable hearing devices, like in-ear audio monitors, often include multiple receivers, optimized for different parts of the frequency spectrum, ganged together to provide high fidelity audio. In these and other applications size and performance are paramount considerations in the selection of the one or more receivers. FIG. 4 shows a prior art motor 400 situated in a housing 410 wherein a prior art yoke includes a portion 402 situated in a yoke-accommodating aperture 412 of the housing to reduce the z-dimension or overall height of the receiver. However magnetic radiation leakage via the aperture can interfere with the electrical performance (e.g., telecoils and other circuits) of the hearing device in which the receiver is integrated. Thus there is an ongoing need for further improvements in receivers.

BRIEF DESCRIPTION OF THE DRAWINGS

The objects, features and advantages of the present disclosure will become more fully apparent upon consideration of the following detailed description and appended claims in conjunction with the accompanying drawings. The drawings depict only representative embodiments and are therefore not considered to limit the scope of the disclosure.

Prior art

Those of ordinary skill in the art will appreciate that the figures are illustrated for simplicity and clarity and therefore may not be drawn to scale and may not include well-known features, that the order of occurrence of actions or steps may be different than the order described and that the order of occurrence of actions or steps may be performed concurrently unless specified otherwise, and that the terms and expressions used herein have the meaning understood by those of ordinary skill in the art except where a different meaning is attributed to them herein.

DETAILED DESCRIPTION

The disclosure relates generally to balanced armature receivers and more particularly to balanced armature receivers having reduced dimensions and improved performance, as well as motors and components for such receivers.

Figure 1:
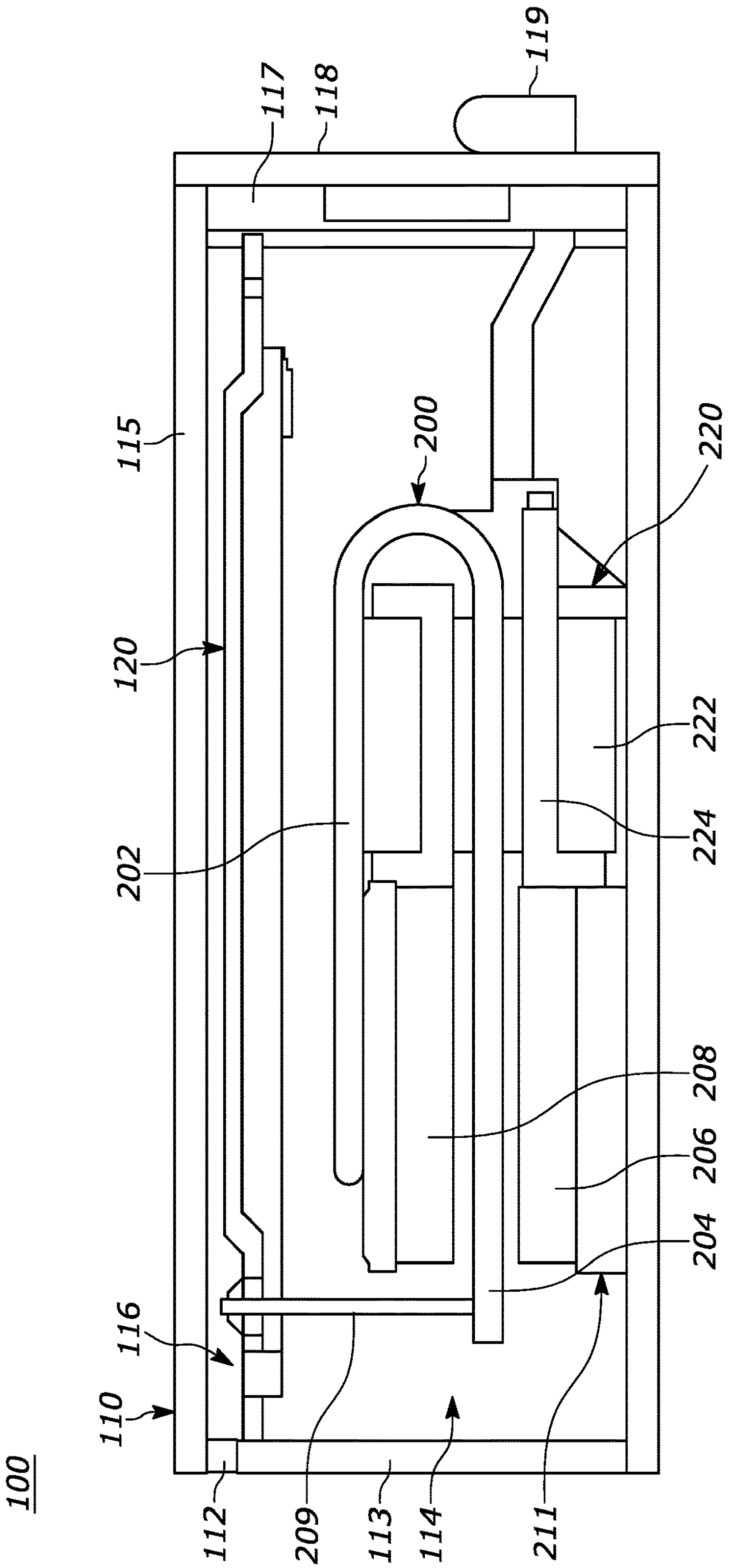
FIG. 1 is a schematic sectional view of balanced armature receiver having a reduced height profile.

Balanced armature receivers generally comprise a diaphragm disposed in a housing and separating an interior thereof into a back volume and a front volume acoustically coupled to a sound port. In FIG. 1, the receiver 100 comprises a housing 110, and a diaphragm 120 separating an interior of the housing into a back volume 114 and a front volume 116 connected to a sound port 112 located on an endwall 113 of the housing. In other implementations, the sound port can be located on a housing wall portion 115 parallel to the diaphragm or on some other wall portion defining the front volume. The housing can comprise top and bottom cups fastened together upon assembly of the diaphragm and other components described herein, or a single cup with a cover plate. Other housings can comprise a closed sidewall portion having open top and bottom ends covered by discrete top and bottom plates, respectively.

The receiver also comprises an electromagnetic motor disposed in the housing for actuating the diaphragm. The motor is most often located in the back volume, but the motor can also be located in the front volume. The motor generally comprises an armature having a first portion fastened to a yoke and a second portion movably located between magnets retained within a passage of the yoke. The second portion of the armature is connected to the diaphragm wherein movement of the armature also moves the diaphragm as described further herein.

The motor also includes an electrical coil assembly electromagnetically coupled to the armature. The coil assembly is most often configured about the armature, but in other implementations the coil assembly can be electromagnetically coupled to the armature without being configured about the armature. The coil assembly minimally comprises an insulated wire bound in a form for electromagnetic coupling to or with the armature. In some implementations, the insulated wire is wound about a bobbin having a passage through which the armature extends. Alternatively, an epoxy or glue can bind the insulated wire in a coil form having a passage through which the armature extends. Ends of the coil wire are electrically coupled directly, or by heavier wires or conductive leads, to corresponding contacts at an interface (e.g., a terminal board) located on an exterior of the housing. Application of an electrical audio signal to the coil assembly induces a magnetic field in the armature that responsively vibrates between the magnets retained by the yoke.

In FIG. 1, the motor comprises an armature 200 having a first portion 202 connected to a yoke 211 and a second portion 204 movably disposed between magnets 206, 208 retained in spaced apart relation by the yoke. The yoke generally comprises a soft magnetic material. An electrical coil assembly 220 comprises an insulated wire 222 wound about a bobbin 224 having an armature passage aligned with the space between the magnets. The armature extends through the passage of the bobbin, or through the coil in embodiments without a bobbin, and into the space between the magnets. A distal portion of the armature extending through the space between the magnets is connected to a movable portion (known as a paddle) of the diaphragm by a drive rod or other link 209. Alternatively, the drive rod can be connected to a more central portion of the armature and paddle and extend through a space between the coil and yoke and through an opening in the armature.

In FIG. 1, wires of the coil assembly are connected to corresponding electrical contacts 119 on a terminal board 118 located on an endwall 117 of the housing. In other embodiments, the terminal board can be located on some other wall portion of the housing. An electrical audio signal applied to the electrical contacts causes the armature to vibrate between the magnets and actuate the diaphragm. The vibrating diaphragm emits sound from the sound port via the front volume of the housing.

The yoke generally comprises a close-ended wall structure having multiple folded corners defining a passage through the yoke. In FIGS. 2-3, 6 and 8, the close-ended wall structure generally comprises first and second magnet retaining wall portions 210, 220 arranged in parallel for retaining corresponding magnets in spaced apart relation within the passage of the yoke. The closed-ended wall structure further comprises first and second sidewall portions 230, 240 interconnecting the first and second magnet retaining wall portions. The yoke can comprise a single piece of folded soft metal sheet material or multiple pieces of folded sheet material. Representative examples are described herein.

Figure 2:
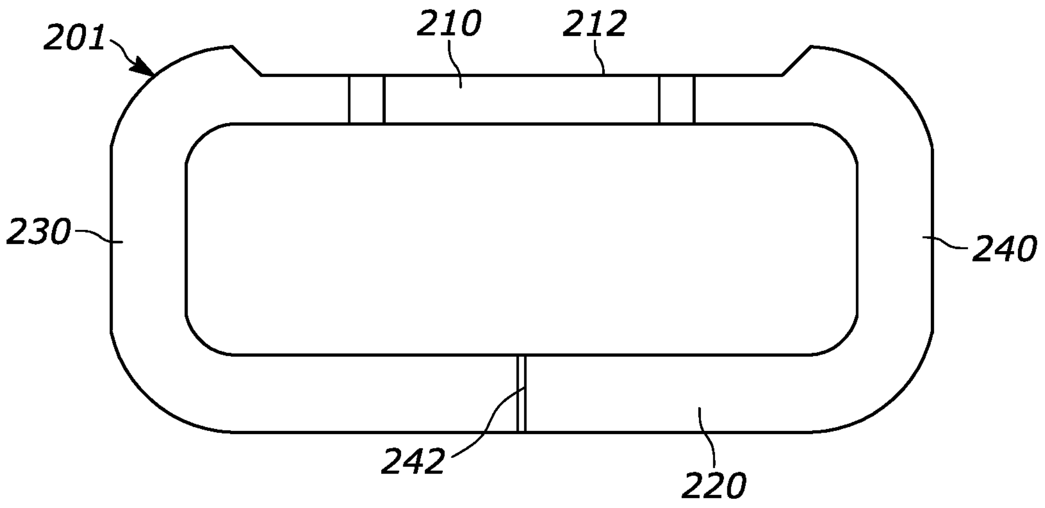
FIG. 2 is an end view of a yoke having a non-uniform wall thickness for reducing a z-axis or height profile of a receiver.
Figure 3:
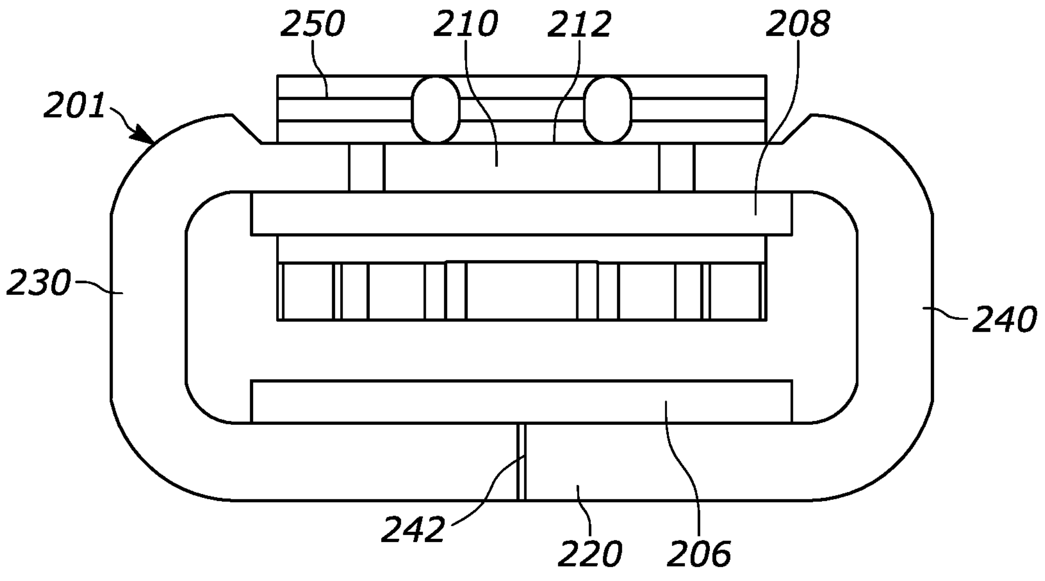
FIG. 3 is an end view of a yoke having a reduced thickness portion connected to an armature.

In FIGS. 2-3, the close-ended wall structure 201 comprises a single soft magnetic alloy sheet member having end portions mated at a butt joint 242. The butt joint is located in the second magnet retaining portion 220, but can be located in other portions of the close-ended wall structure like one of the sidewall portions 230, 240 or the first magnet retaining portion 210. The joint can be secured by a weld or by interlocking portions of the abutting ends, or both.

Figure 5:
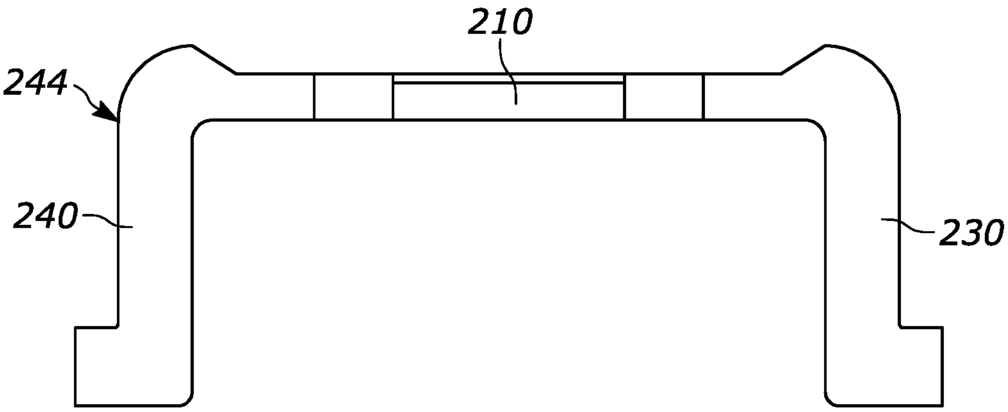
FIG. 5 is an alternative yoke portion having a reduced thickness portion.
Figure 6:
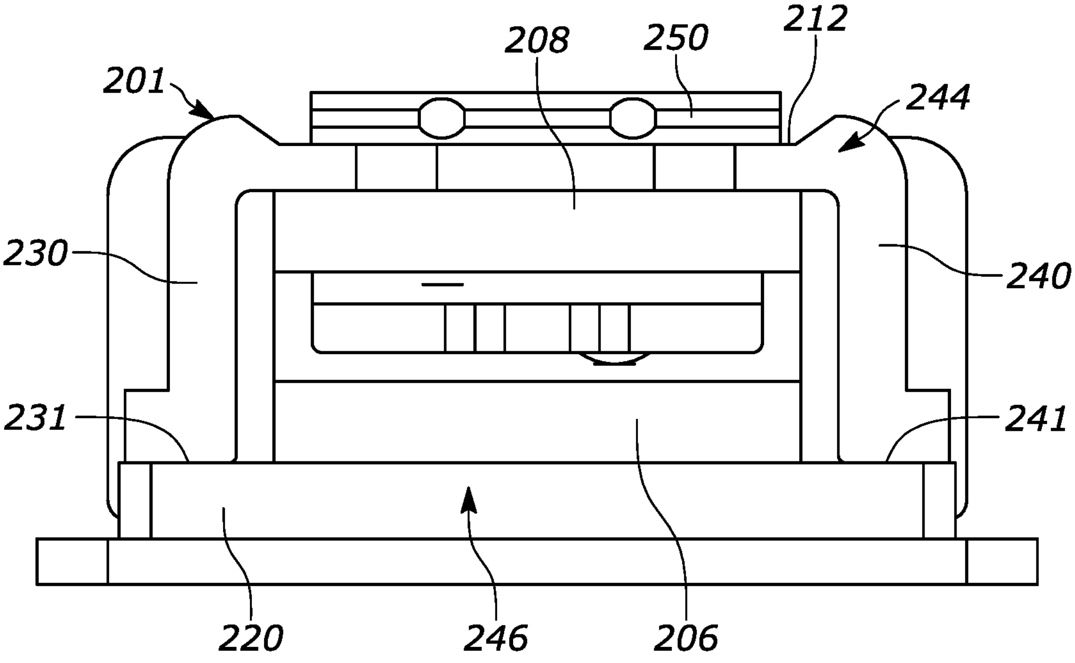
FIG. 6 is a partial end view of a motor including the yoke portion of FIG. 5.
Figure 8:
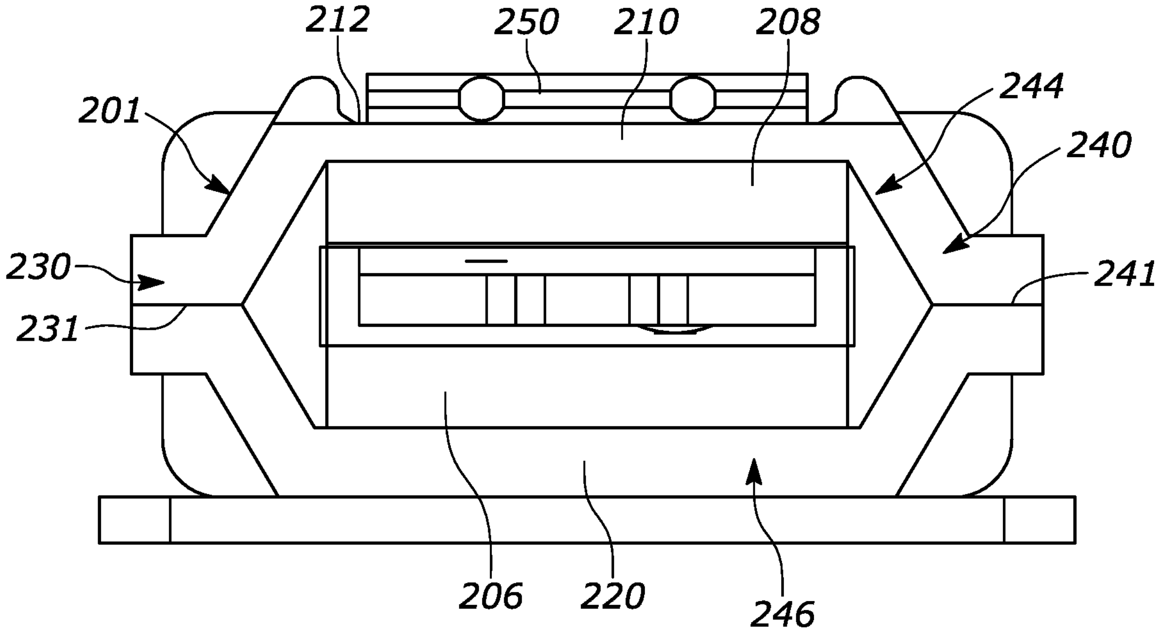
FIG. 8 is a partial end view of a motor including the yoke portion of FIG. 7.

In FIGS. 6 and 8, the close-ended wall structure 201 comprises a first yoke portion 244 including at least the first magnet retaining wall portion 210, and a second yoke portion 246 including at least the second magnet retaining wall portion 220. The first yoke portion is fastened to the second yoke portion. In FIGS. 5-6, the first yoke portion 244 comprises the first magnet retaining wall portion 210 and the first and second sidewall portions 230, 240. In FIG. 6, the second yoke portion comprises only the second magnet retaining wall portion 220. Alternatively, the sidewalls 230, 240 can be part of the second yoke portion 220, or each yoke portion can include only one of the sidewalls. In FIG. 8, the first and second yoke portions each include portions of both sidewalls, wherein the first and second yoke portions are fastened at joints 231, 241 between the sidewall portions, respectively. The first and second yoke portions can be fastened by welds, conductive glue or epoxy or some other fastening mechanism at the joints. The mating portions of the sidewalls 230 and 240 in FIG. 8 are not perpendicular to the first and second magnet retaining wall portions as in the embodiments of FIGS. 2-3 and 5-6. In FIG. 8, the mating sidewall portions form an apex pointing away from the passage.

Figure 7:
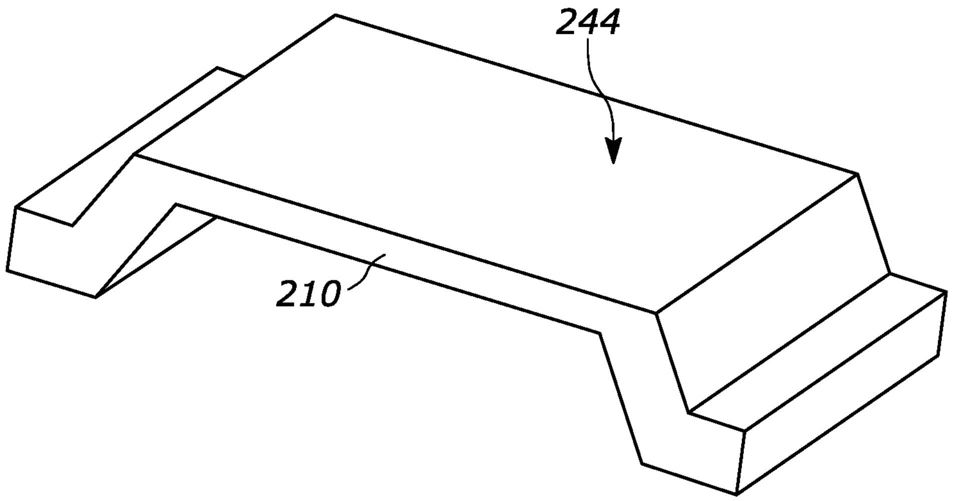
FIG. 7 is another alternative yoke portion having a reduced thickness portion.

At least a portion of the first magnet retaining wall portion has a reduced thickness relative to other wall portions of the close-ended wall structure. In FIGS. 2-3, 5-6 and 8, only a portion of the first magnet retaining wall portion 210 has reduced thickness. In FIG. 7, the entirety of the first magnet retaining wall portion 210 has reduced thickness. In FIGS. 2-3, 5-6 and 8, the first magnet retaining wall portion 210 comprises a recessed portion 212 relative to other portions of the first magnet retaining wall portion. The recessed portion is located between corners having thicknesses not less than a thickness of other portions of the close-ended wall structure. The recessed portion of the first magnet retaining wall portion corresponds to the portion of the first magnet retaining wall portion having reduced thickness. The recessed portion can be located on an inner or outer surface of the closed-ended wall structure.

In FIGS. 2-3, 5-6 and 8, the recessed portion 212 can be a coined recess formed prior to folding the close-ended wall structure. In FIG. 7, the reduced thickness portion of the first magnet retaining wall portion 210 can be a coined portion of a soft magnetic sheet material formed prior to folding the close-ended wall structure. The recessed portion and more generally the reduced thickness portion of the first magnet retaining wall portion can be formed alternatively by coining, milling, grinding or etching among other known and future material removal processes.

A portion of the armature is fixed to the portion of the first magnet retaining wall structure having reduced thickness. Generally the armature can be fixed to an inner or outer surface of the close-ended wall structure. The armature can be fixed to the yoke by a weld, conductive glue or epoxy among other known or future fastening mechanism. In FIGS. 3, 6 and 8, the recessed portion 212 of the first magnet retaining wall portion is sized to accommodate a portion 250 of the armature on an outer surface of the yoke. The armature portion 250 can correspond to at least a portion of the first portion 202 of the armature described herein and shown in FIG. 1.

In one implementation, the second magnet retaining wall portion 220 and the first and second sidewall portions 230, 240 have uniform thicknesses. The folded corners or joints in multi-part yokes can have a thickness at least as thick as the uniform thickness of the wall portions to reduce magnetic field saturation at the joints or corners. In FIGS. 6 and 8, joints between the yoke portions 231, 241 include flange portions that make the joints thicker than the uniform thickness of the wall portions.

At least the armature accommodating portion of the first magnet retaining wall portion has a thickness less than the thickness of the other wall portions of the close-ended wall structure. In one implementation, a combined thickness of the reduced thickness portion of the first magnet retaining wall portion and the portion of the armature fixed to the first magnet retaining wall portion is the same as or greater than the uniform thickness of other wall portions of the close-ended wall structure. In FIGS. 3, 6 and 8, the recessed portion is sized so that the combined thickness of the armature portion 250 and the recessed portion 212 of the first magnet retaining wall portion 210 is the same as the uniform thickness of the other wall portions of the close-ended wall structure. The reduced thickness portion (e.g., the recessed portion 212) can have a thickness as much as 40% or more less than a thickness of the other wall portions of the close-ended wall structure. A yoke comprising a close-ended wall structure with uniform wall thick improves magnetic performance.

Figure 4:
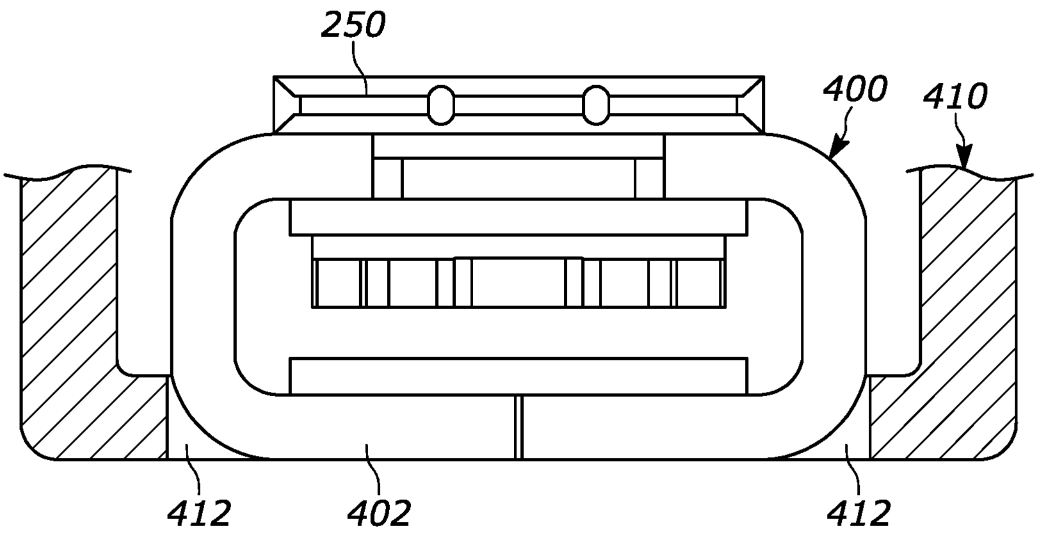
Prior Art FIG. 4
FIG. 4 is an end view of a prior art yoke connected to an armature.

Fixing the armature to the reduced thickness portion of the close-ended wall structure reduces the overall z-axis dimension (e.g., height) of the motor. The reduced motor dimension permits reducing a corresponding dimension of the receiver in which the motor is integrated, without the need to provide the yoke-accommodating aperture 412 in the housing as shown in prior art FIG. 4. Absent the yoke-accommodating aperture, the yoke is fully contained within the housing and there is comparatively less leakage of magnetic field radiation thereby reducing interference with the electrical performance of the host hearing device. The overall z-axis dimension of the receiver can be further reduced without the risk of magnetic radiation leakage by forming a recess that does not extend fully through the housing. The overall z-axis dimension of the receiver can also be reduced by using a motor having a yoke with a reduced z-axis dimension in combination with a yoke-accommodating aperture in the housing as shown in prior art FIG. 4 where interference by leaked magnetic fields is not problematic.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A balanced armature receiver yoke for retaining magnets in spaced apart relation and fastening to an armature, the balanced armature receiver yoke comprising:

a close-ended wall structure comprising multiple folded corners defining a passage through the closed-ended wall structure, the close-ended wall structure is a soft magnetic material comprising:

a first magnet retaining wall portion;

a second magnet retaining wall portion arranged in parallel with, and opposite, the first magnet retaining wall portion; and at least a portion of the first magnet retaining wall portion having a reduced thickness relative to other wall portions of the close-ended wall structure;

the portion having the reduced thickness sized to accommodate, at least partially, a portion of the armature fixable to the close-ended wall structure.

2. The balanced armature receiver yoke of claim 1, the first magnet retaining wall portion comprising a recessed portion on an outer surface of the closed-ended wall structure, wherein the recessed portion corresponds to the portion of the first magnet retaining wall portion having the reduced thickness.

3. The balanced armature receiver yoke of claim 2, the other wall portions of the close-ended wall structure having a uniform thickness.

4. The balanced armature receiver yoke of claim 2, wherein the recessed portion is a coined recess.

5. The balanced armature receiver yoke of claim 2, the closed-ended wall structure further comprising first and second sidewall portions interconnecting the first and second magnet retaining wall portions, wherein the second magnet retaining wall portion and the first and second sidewall portions have a uniform thickness.

6. The balanced armature receiver yoke of claim 5, the close-ended wall structure comprising a single folded sheet member having end portions mated at a joint.

7. The balanced armature receiver yoke of claim 5, the close-ended wall structure comprising a first yoke portion including at least the first magnet retaining wall portion, and a second yoke portion including at least the second magnet retaining wall portion, wherein the first yoke portion is fastened to the second yoke portion.

8. The balanced armature receiver yoke of claim 5, wherein the recessed portion has a thickness at least 40% less than a thickness of the other wall portions of the close-ended wall structure.

9. A balanced armature receiver motor comprising:

a close-ended wall structure comprising multiple folded corners defining an armature passage through the close-ended wall structure, the close-ended wall structure is a soft magnetic material comprising:

a first magnet retaining wall portion;

a second magnet retaining wall portion arranged in parallel with, and opposite, the first magnet retaining wall portion; and the first magnet retaining wall portion having a portion with a reduced thickness compared to thicknesses of other wall portions of the close-ended wall structure;

a first magnet located in the armature passage and fastened to the first magnet retaining wall portion, and a second magnet located in the armature passage and fastened to the second magnet retaining wall portion;

an armature having a first portion fastened to the portion of the first magnet retaining wall portion having reduced thickness, the first portion of the armature opposite the first magnet, the armature having a second portion movably located in the armature passage between the first and second magnets; and an electrical coil assembly electromagnetically coupled to the armature.

10. The balanced armature receiver motor of claim 9, the first magnet retaining wall portion comprising a recessed portion on an outer surface of the closed-ended wall structure, the recessed portion defining the portion of the first magnet retaining wall portion having the reduced thickness, the first portion of the armature fastened to the recessed portion.

11. The balanced armature receiver motor of claim 10, the closed-ended wall structure further comprising first and second sidewall portions interconnecting the first and second magnet retaining wall portions, wherein the second magnet retaining wall portion and the first and second sidewall portions have a uniform thickness.

12. The balanced armature receiver motor of claim 11, wherein a combined thickness of the recessed portion and the first portion of the armature fastened to the recessed portion is same as the thickness of all other wall portions of the close-ended wall structure.

13. The balanced armature receiver motor of claim 12, the close-ended wall structure comprising a single folded sheet member having end portions mated at a joint.

14. The balanced armature receiver motor of claim 12, the close-ended wall structure comprising a first yoke portion including at least the first magnet retaining wall portion, and a second yoke portion including at least the second magnet retaining wall portion, wherein the first yoke portion is fastened to the second yoke portion.

15. A balanced armature receiver comprising:

a housing having a sound port;

a diaphragm disposed in the housing and separating the housing into a back volume and a front volume acoustically coupled to the sound port;

a yoke comprising a close-ended wall structure having multiple folded corners defining a passage through the yoke, the close-ended wall structure is a soft magnetic material comprising:

a first magnet retaining wall portion;

a second magnet retaining wall portion arranged in parallel with, and opposite, the first magnet retaining wall portion; and at least a portion of the first magnet retaining wall portion having a reduced thickness relative to other wall portions of the close-ended wall structure;

an armature having a first portion fastened to an outer surface of the portion of the first magnet retaining wall portion having the reduced thickness, the armature having a second portion movably located between magnets retained within the passage of the yoke, the second portion of the armature connected to the diaphragm; and an electrical coil assembly disposed about the armature.

16. The balanced armature receiver of claim 15, the first magnet retaining wall portion comprising a recessed portion on an outer surface of the closed-ended wall structure, the recessed portion defining the portion of the first magnet retaining wall portion having the reduced thickness, the first portion of the armature fastened to the recess.

17. The balanced armature receiver of claim 16, the closed-ended wall structure further comprising first and second sidewall portions interconnecting the first and second magnet retaining wall portions, wherein the second magnet retaining wall portion and the first and second sidewall portions have a uniform thickness.

18. The balanced armature receiver of claim 17, wherein a combined thickness of the recessed portion and the first portion of the armature fastened to the recessed portion is same as the thickness of all other wall portions of the close-ended wall structure.

19. The balanced armature receiver of claim 18, the close-ended wall structure comprising a single folded sheet member having end portions mated at a joint.

20. The balanced armature receiver of claim 18, the close-ended wall structure comprising a first yoke portion including at least the first magnet retaining wall portion, and a second yoke portion including at least the second magnet retaining wall portion, wherein the first yoke portion is fastened to the second yoke portion.

21. The balanced armature receiver of claim 18, wherein housing is devoid of a yoke-accommodating aperture and the yoke is fully contained within the housing.

* * * * *